J. HOLLINGSWORTH & W. W. WALCOTT.
BEE-HIVES.

No. 195,606. Patented Sept. 25, 1877.

WITNESSES
Henry N. Miller
Frank Galt

INVENTOR
J. Hollingsworth
and
W. W. Wolcott.

ATTORNEYS

UNITED STATES PATENT OFFICE.

JOSEPH HOLLINGSWORTH AND WILLIAM W. WALCOTT, OF ROCKDALE COUNTY, GEORGIA.

IMPROVEMENT IN BEE-HIVES.

Specification forming part of Letters Patent No. 195,606, dated September 25, 1877; application filed July 6, 1877.

*To all whom it may concern:*

Be it known that we, JOSEPH HOLLINGSWORTH and W. W. WALCOTT, of the county of Rockdale, in the State of Georgia, have invented certain new and useful Improvements in a Bee-Hive; and do hereby declare that the following is a full, clear, and exact description thereof, reference being had to the accompanying drawings, and to the letters of reference marked thereon, making a part of this specification.

The nature of our invention consists in the construction and arrangement of a bee-hive, as will be hereinafter more fully set forth.

In order to enable others skilled in the art to which our invention appertains to make and use the same, we will now proceed to describe its construction and operation, referring to the annexed drawing, in which—

Figure 1:
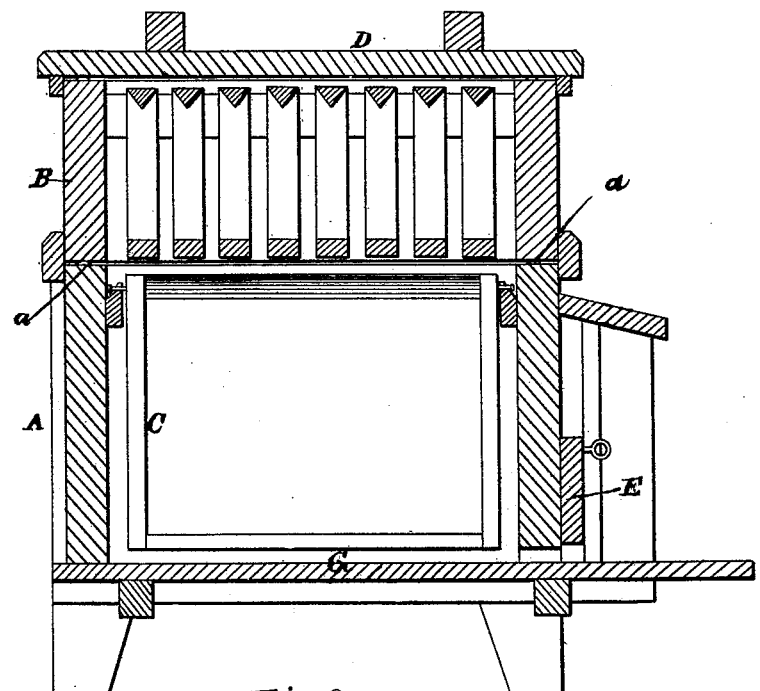
Figure 2:
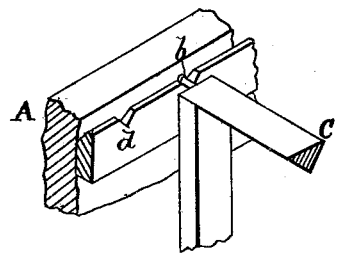

Figure 1 is a vertical section of our bee-hive. Fig. 2 is a detailed view of a part thereof.

The brood-chamber A of our hive is made twelve and a half inches square inside, and twelve inches from top to bottom. The upper part or honey-box is the same size square and six inches deep. This size enables us to put nine racks, $c\ c$, in the lower chamber, thereby causing the bees to build comb of sufficient depth to raise young bees in the lower chamber. When they have more space, as in the upper box between the racks, they build their cells too deep for the queen to lay in the bottom of the cell; consequently she confines herself to the lower racks, and nothing but honey is obtained from the upper box, which can be extracted, at any time before they cap it over, without moving the comb; and this they will again fill in four or five days ready for the extractor again. The bees can be made to work either in the top or bottom, or both, at pleasure.

In the sides of the boxes, at the adjoining edges, are pins $a\ a$ to hold the boxes apart to prevent killing any bees when putting the hive together while working with them.

The size of this hive enables the bees to keep up a sufficiency of heat to hatch young bees, keep their loss supplied, and work their wax much earlier in the season than if the hive were larger.

The bees can be easily fed by removing the top lid D and lifting out a rack and pouring into the comb dissolved sugar or other substance which they will deposit in other places convenient for their disposal.

G is the bottom of the hive, made movable to be drawn out and pushed in as required for cleaning the same, and thereby destroying the moth-eggs.

Each rack has a pin, $b$, at the top on each end, and rests in notched strips $d$.

In the front of the hive is a drop-door, E, to be raised when drawing out the bottom, so as not to disturb the bees that may be upon it; also in hiving a swarm, giving them more room, or giving them more or less room at any time.

In the construction of the racks their top bars are brought to sharp edges—that is, perfectly triangular in cross-section—which causes the bees to build straight in them. When any square is left on the edges they will cross and hitch them together, which gives trouble.

Having thus fully described our invention, what we claim as new, and desire to secure by Letters Patent, is—

In a bee-hive composed of two or more boxes placed on top of each other, pins or their equivalents interposed between said boxes for keeping them separate, substantially for the purposes herein set forth.

In testimony that we claim the foregoing we have hereunto set our hands and seals this 30th day of June, 1877.

JOSEPH HOLLINGSWORTH. [L. S.]
W. W. WALCOTT. [L. S.]

Witnesses:
A. A. ZACHARY,
GEO. W. GLEATON.